United States Patent
Bhardwaj et al.

(10) Patent No.: US 9,436,009 B1
(45) Date of Patent: *Sep. 6, 2016

(54) MODULAR ACCESSORIES FOR HEAD-MOUNTABLE DEVICE

(71) Applicant: Google Inc., Mountain View, CA (US)

(72) Inventors: Ramesh Bhardwaj, Fremont, CA (US); Eliot Kim, Cupertino, CA (US); Russell Norman Mirov, Los Altos, CA (US)

(73) Assignee: Google Inc., Mountain View, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/930,626

(22) Filed: Jun. 28, 2013

(51) Int. Cl.
*G02B 27/14* (2006.01)
*G02B 27/01* (2006.01)

(52) U.S. Cl.
CPC .................. *G02B 27/017* (2013.01)

(58) Field of Classification Search
CPC .......... G02B 27/0103; G02B 27/0172; G02B 27/0149; G02B 27/0101; G02B 27/017; G02B 5/3058; H04N 9/3197; G06T 19/00; G06T 19/006
USPC ............... 359/13, 242, 485.05, 489.08, 632; 345/7, 8, 419, 633
See application file for complete search history.

(56) References Cited

U.S. PATENT DOCUMENTS

| | | | | |
|---|---|---|---|---|
| 4,753,514 A * | 6/1988 | Kubik | | 359/618 |
| 5,129,716 A * | 7/1992 | Holakovszky et al. | | 351/50 |
| 5,162,828 A * | 11/1992 | Furness et al. | | 353/122 |
| 5,404,385 A * | 4/1995 | Ben-Haim | | 377/24.2 |
| 5,539,422 A * | 7/1996 | Heacock et al. | | 345/8 |
| 5,585,871 A * | 12/1996 | Linden | | 351/158 |
| 5,671,037 A * | 9/1997 | Ogasawara et al. | | 351/158 |
| 5,777,715 A * | 7/1998 | Kruegle et al. | | 351/158 |
| 6,091,546 A * | 7/2000 | Spitzer | | 359/618 |
| 6,431,705 B1* | 8/2002 | Linden | | 351/158 |
| 6,474,809 B2* | 11/2002 | Tanijiri et al. | | 351/41 |
| 6,573,952 B1* | 6/2003 | Yamazaki et al. | | 349/13 |
| 7,145,726 B2* | 12/2006 | Geist | | 359/630 |
| 7,192,137 B2* | 3/2007 | Ishibashi et al. | | 351/159.01 |
| 7,410,255 B2* | 8/2008 | Nakazawa et al. | | 351/158 |
| 8,031,878 B2 | 10/2011 | Gauger, Jr. et al. | | |
| 8,337,013 B2 | 12/2012 | Howell et al. | | |
| 2002/0021407 A1* | 2/2002 | Elliott | | 351/158 |
| 2005/0225868 A1* | 10/2005 | Nelson et al. | | 359/630 |
| 2007/0035626 A1 | 2/2007 | Randall et al. | | |

(Continued)

OTHER PUBLICATIONS http://en.memory-alpha.wikia.com/wiki/Virtual_display_device.*

*Primary Examiner* — James Greece
(74) *Attorney, Agent, or Firm* — Lerner, David, Littenberg, Krumholz & Mentlik, LLP

(57) ABSTRACT

An auxiliary component unit for use with a head-mounted device is disclosed. The device can have a first side arm with and an extension arm extending at least partially therealong and configured to present information to the user via a display extending therefrom, a second side arm opposite the first side arm, and an external connection feature. The auxiliary component includes a first housing containing a first electronic component therein and a first attachment member extending from the first housing and configured to removably affix the auxiliary component with a portion of the second side arm of the head-mounted device. The auxiliary component also includes a wiring component in electronic communication with the first electronic component and attachable with the external connection feature of the device.

12 Claims, 12 Drawing Sheets

(56) References Cited

U.S. PATENT DOCUMENTS

| | | | |
|---|---|---|---|
| 2008/0158506 A1* | 7/2008 | Fuziak | 351/158 |
| 2008/0273246 A1* | 11/2008 | Moliton et al. | 359/633 |
| 2009/0296043 A1* | 12/2009 | Moliton et al. | 351/158 |
| 2010/0141892 A1* | 6/2010 | Moliton et al. | 351/158 |
| 2010/0157433 A1* | 6/2010 | Mukawa et al. | 359/633 |
| 2010/0245754 A1* | 9/2010 | Matsumoto et al. | 351/158 |
| 2010/0245756 A1* | 9/2010 | Sugihara et al. | 351/158 |
| 2010/0245757 A1* | 9/2010 | Sugihara et al. | 351/158 |
| 2011/0051077 A1* | 3/2011 | Sugihara et al. | 351/158 |
| 2012/0002159 A1 | 1/2012 | Blum et al. | |

* cited by examiner

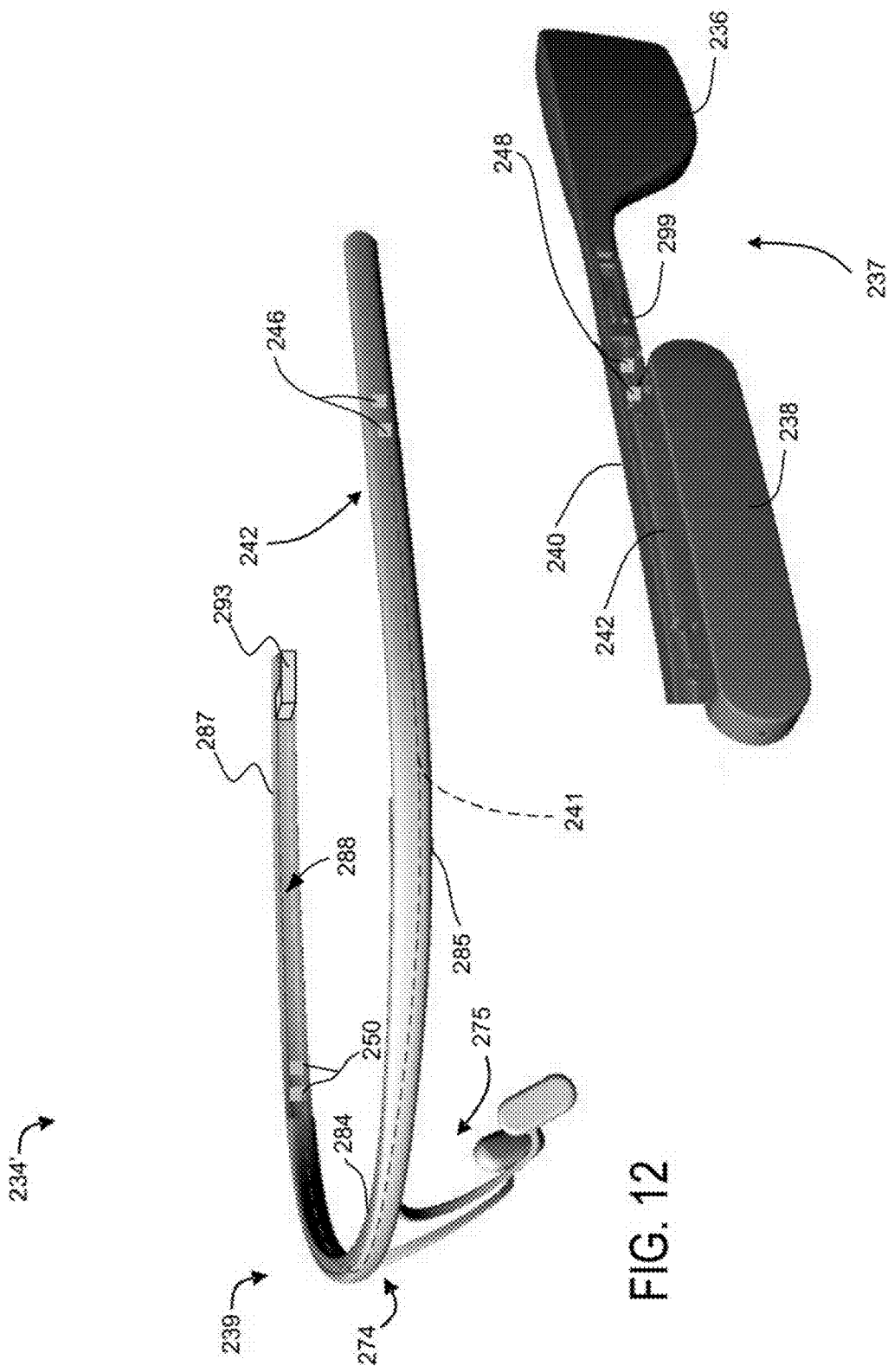

MODULAR ACCESSORIES FOR HEAD-MOUNTABLE DEVICE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive. The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays", "head-mounted displays," "head-mounted devices," or "head-mountable devices." A head-mountable device (HMD) places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible. Other personal image displays can be what is referred to as a heads-up display, wherein the image is displayed on, in, or through a transparent display that superimpose the displayed image over a view of the surrounding environment. These allow the user to view the image presented by the display simultaneously with their surroundings. Such devices, however, can have many limitations, including in their fit and comfort to their wearers as well as limited functionality.

Both head-mounted and heads-up displays can be connected to a video source that receives a video signal that the device can read and convert into the image that they present to the user. The video source can be received from a portable device such as a video player, a portable media player or computers. Some such display devices are also configured to receive sound signals, which are delivered to the user typically through incorporated headphones. The functionality of these types of displays is, however, limited to passive actions wherein the display simply receives information from an external source and presents it to the wearer in limited forms.

Advances have recently been made that have added input functionality to head-mounted display devices as well as connectivity to specially-configured data and information networks and services. These advances, along with further advances in the form-factors, fit, and wearability of such devices have allowed certain such head-mounted display devices to be usable in the everyday life of various consumers. The particular requirements of such devices may, however, vary depending on various users needs or even an individual's needs in particular situations, including the various electronic components that the head-mounted display device requires to carry out the needed functionality.

BRIEF SUMMARY

Various examples of auxiliary component units and assemblies are disclosed herein. Such auxiliary component units and assemblies illustrate various ways in which electronic components can be added to a head-mounted display device and electrically connected therewith to provide added functionality for the device, depending on the particular needs of a user.

One aspect of the present disclosure relates to an auxiliary component unit for use with a head-mounted device. The device can have a first side arm with and an extension arm extending at least partially therealong and configured to present information to the user via a display extending therefrom, and a second side arm opposite the first side arm. The auxiliary component includes a first housing containing a first electronic component therein and a first attachment member extending from the first housing and configured to removably affix the auxiliary component with a portion of the second side arm of the head-mounted device. The auxiliary component also includes a wiring component in electronic communication with the first electronic component and attachable with an electrical connection feature of the device.

Another aspect of the present disclosure relates to a retention system for use with a personal display module. The display module can have a display unit configured to present information to a user via a display mounted thereon, a housing unit remote from the display, and a connecting member extending at least partially between the housing unit and the display and including a first attachment structure and a first conductive contact. The retention system includes a center support, a first side arm extending from the center support on a first side thereof, and an attachment arm extending from the center support on a second side thereof. The attachment arm has a second attachment structure configured to releasably attach with the first attachment structure of the module. The attachment arm further has a second conductive contact that is positioned to engage with the first conductive contact of the module. The retention system further includes a component module disposed on the first side arm and containing a first electronic component that is electrically connected with the second conductive element through a portion of the first side arm, the center support, and a portion of the second side arm. The releasable attachment between the first attachment structure and the second attachment structure removably secures the retention member to the display module such that a resulting assembly is wearable on the head of a user with the display of the display module positioned adjacent an eye of the user and such that the first electronic component is electrically connected with the display module by engagement between the first and second conductive contacts. The first side arm, center support, and attachment arm can be portions of a band configured to continuously extend a general "U" shape.

A further aspect of the present disclosure relates to an auxiliary component unit for use with a head-mounted device. The head-mounted device an have a center support extending in generally lateral directions, a first side arm extending from a first end of the center frame support, a second side arm extending from a second end of the center support, and an extension arm configured to present information to the user via a display extending therefrom. The extension arm can extend at least partially along the first side arm on a first side of the center support. The auxiliary component unit includes an attachment member having a resiliently deformable channel sized to capture and maintain a portion of the second side arm therein. The unit further includes a first housing affixed with the attachment member such that assembly of the attachment member with the second side arm retains the first housing on the second side arm. The first housing contains a first electronic component therein. A connection cable extends from the auxiliary component unit and is in electronic communication with the first electronic component. The connection cable is attachable with an electrical connection feature of the device.

BRIEF DESCRIPTION OF THE DRAWINGS

FIG. 12 shows a variation of the retention assembly of FIG. 10 with an alternative modular accessory component.

DETAILED DESCRIPTION

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Systems and devices in which example embodiments may be implemented will now be described in greater detail. In general, an example system may be implemented in or may take the form of a wearable computer (also referred to as a wearable computing device). In an example embodiment, a wearable computer takes the form of or includes an HMD, which may also be referred to herein as a head-mounted device.

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

Figure 1A:
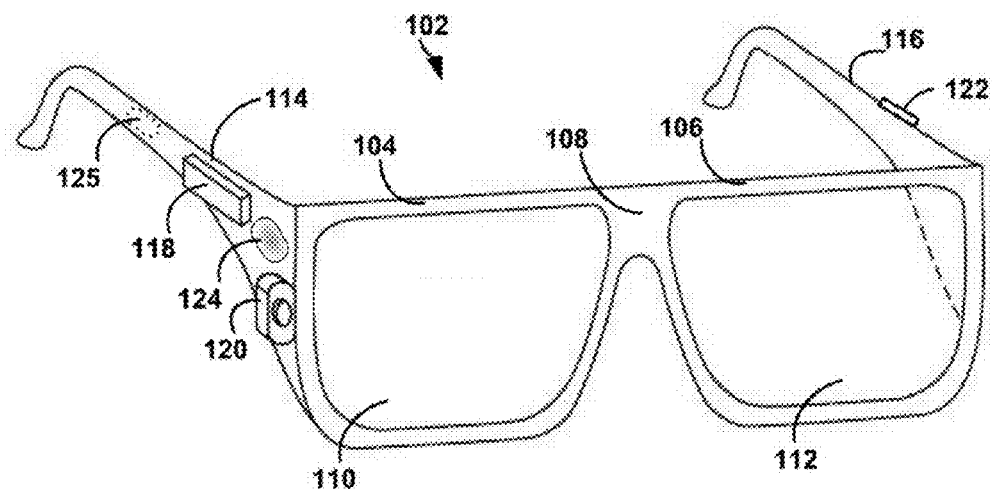
FIG. 1A illustrates a wearable computing system according to an example embodiment.

FIG. 1A illustrates a wearable computing system according to an example embodiment. In FIG. 1A, the wearable computing system takes the form of a head-mountable device (HMD) 102. However, example systems and devices may take the form of or be implemented within or in association with other types of devices. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 122 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 may also include a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of BCTs may be employed, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
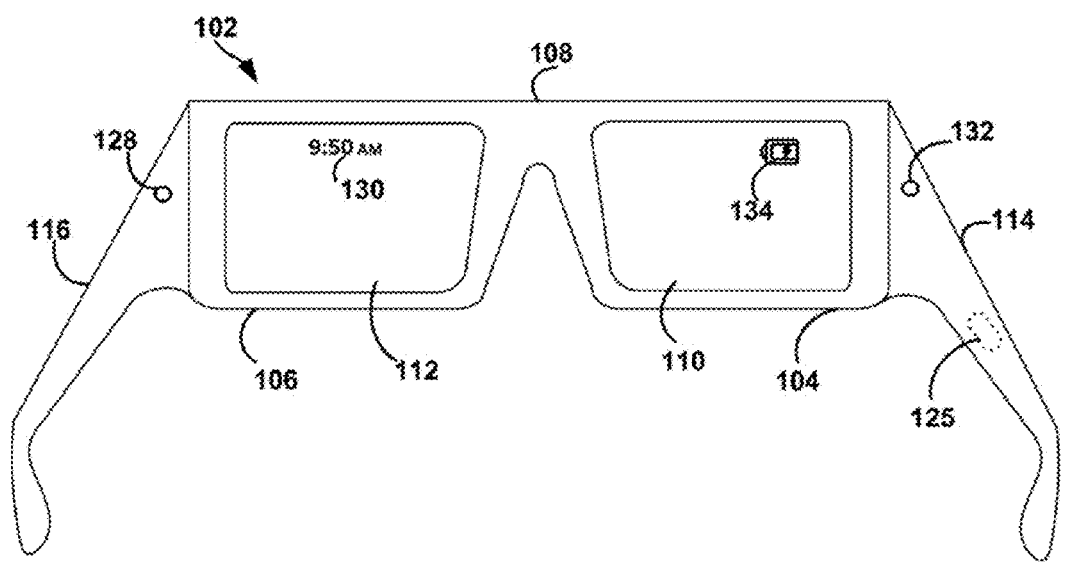
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
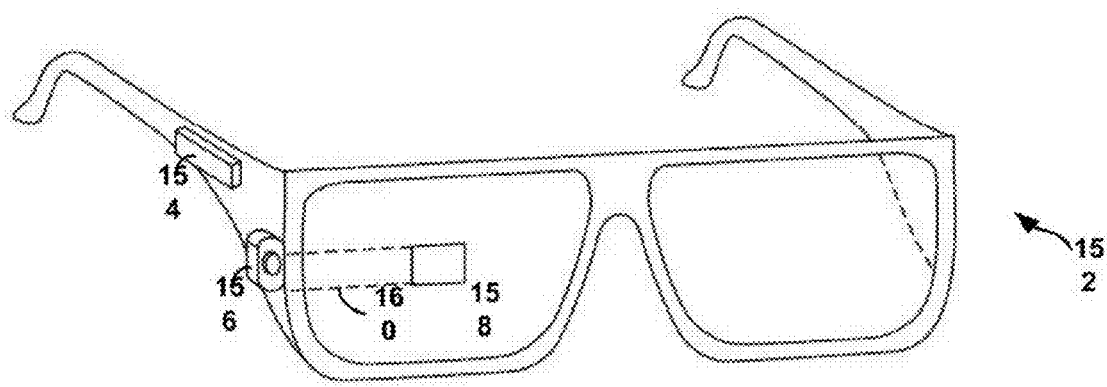
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
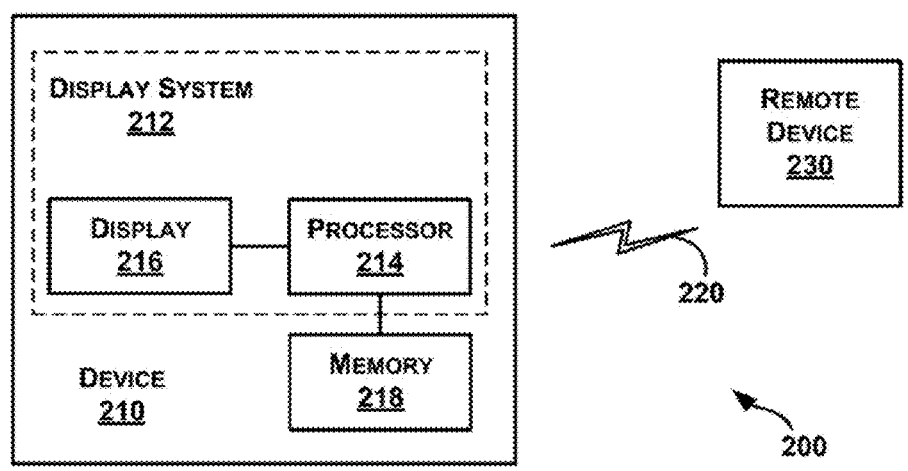
FIG. 1D illustrates another wearable computing system according to an example embodiment.

FIG. 1D shows system 200 illustrated within a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1C or in FIG. 2-10.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 1D, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 2:
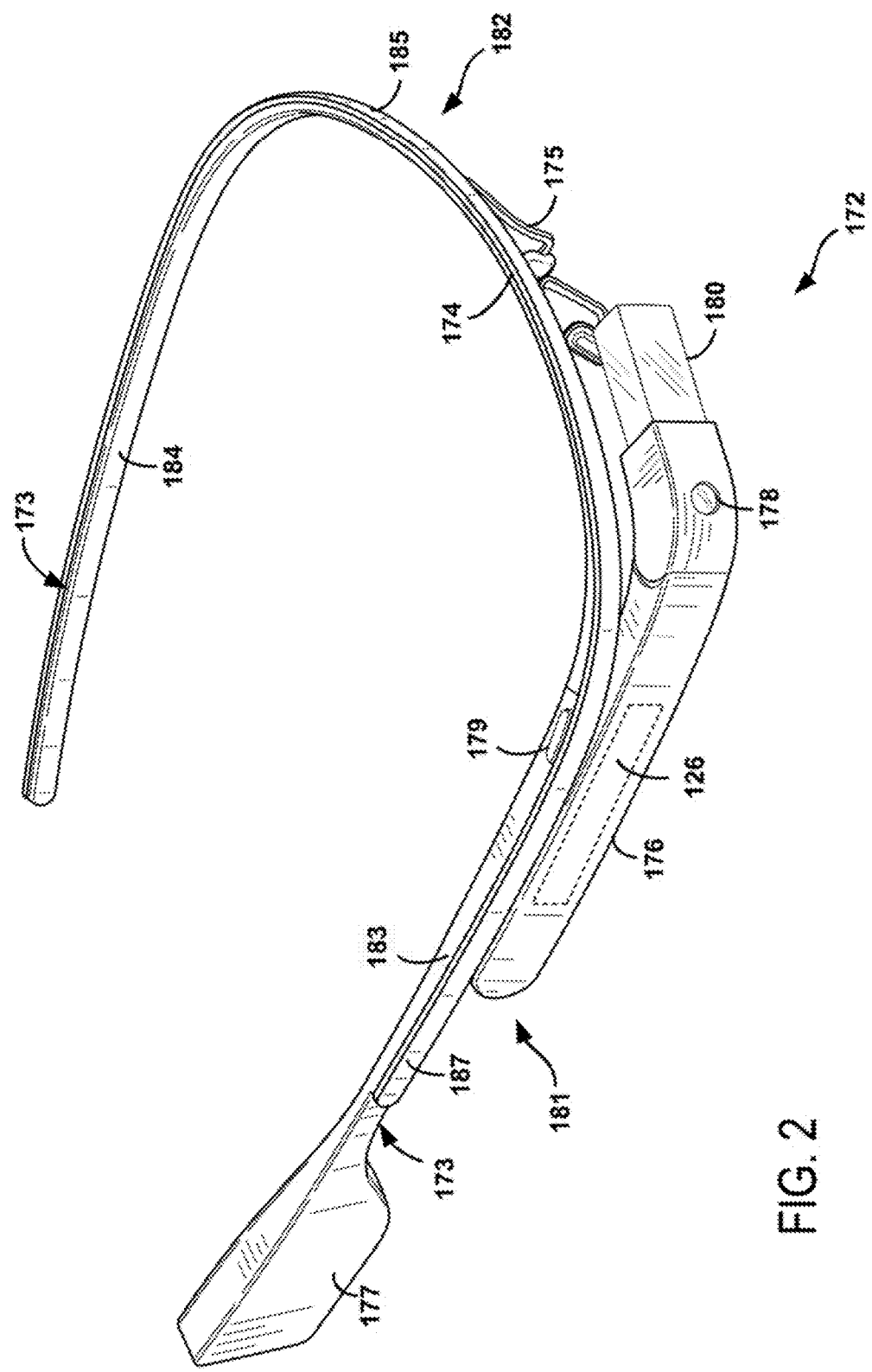
FIGS. 2 and 3 show a wearable computer device according to an embodiment of the disclosure.
Figure 3:
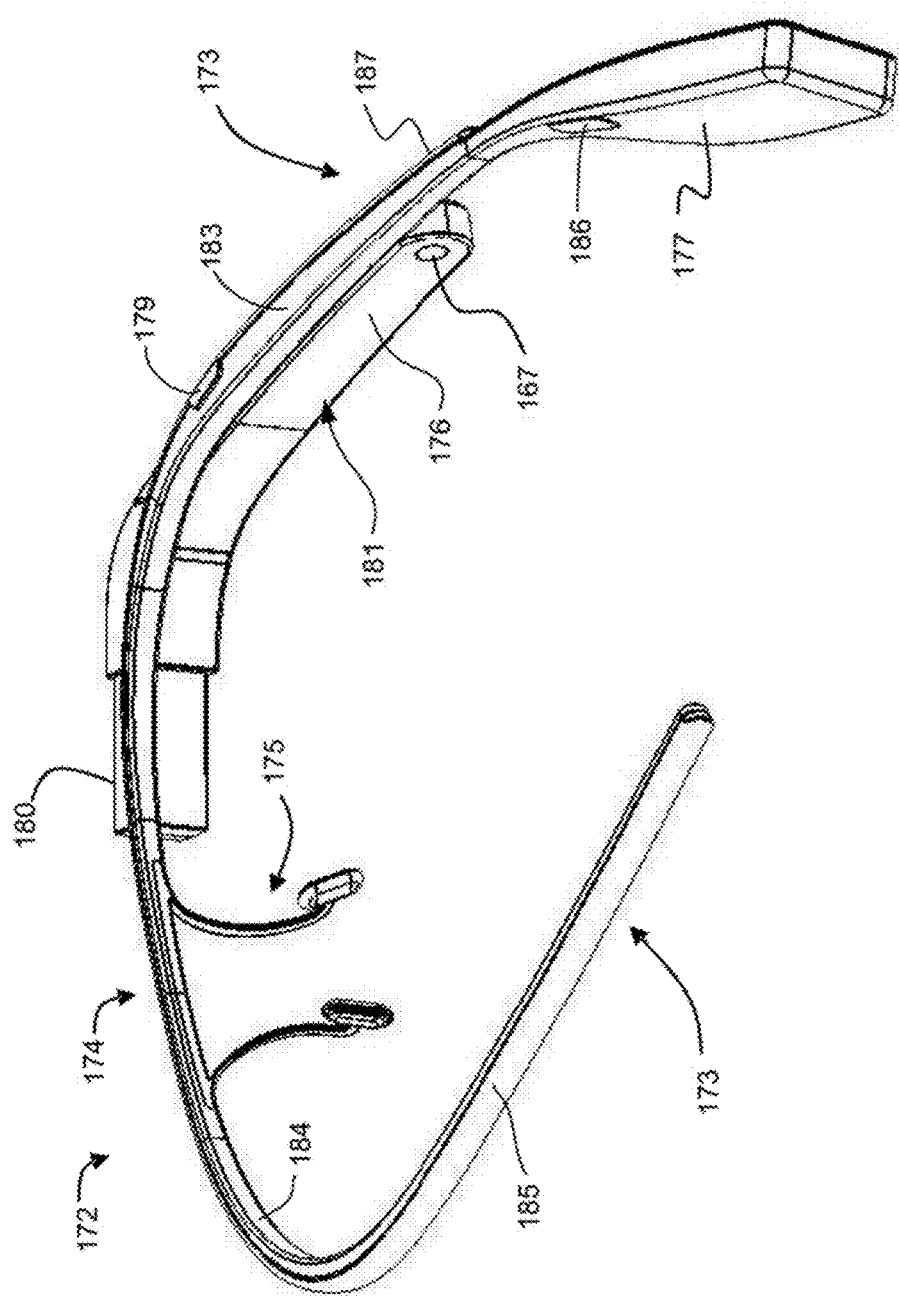

FIGS. 2 and 3 illustrate another wearable computing system according to an example embodiment, which takes the form of a monocular HMD 172. The HMD 172 may include side-arms 173, a center frame support 174, and a bridge portion with nosepiece 175. In the example shown in FIG. 2, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD.

Additionally, component housing 176 can include additional input structures, such as a button 167 (shown in FIG. 3) that can provide additional functionality for HMD 172, including implementing a lock or sleep feature or allowing a user to toggle the power for HMD 172 between on and off states. The button 167 can further include an LED light beneath a surface thereof that can indicate a status of the device, such as on or off, or asleep or awake. The button can be configured such that the light is visible when on, but that the source of the light cannot be seen when the light is off.

The HMD 172 may include a single display 180, which may be coupled to one of the side-arms 173A via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

As shown in FIGS. 2 and 3, an end of one of the side arms 173A can be enlarged in the form of an auxiliary housing 177 that can house circuitry and/or a power supply (e.g., removable or rechargeable battery) for HMD 172. In an example, auxiliary housing 177 can be configured and positioned to provide a balancing weight to that of component housing 176. The components within auxiliary housing 177, such as a battery or various control circuitry can be arranged to contribute to a desired weight distribution for HMD 172. HMD 172 also includes a BCT 186 (FIG. 3) positioned on an inner surface of auxiliary housing 177 such that BCT 186 contacts the head of a wearer of HMD 172.

It is also noted that, although the embodiment of FIGS. 2 and 3 shows a component housing 176 that is positioned on side arm 173A such that it is positioned over the right eye of a user when being worn, other similar embodiments are possible in which a mirror-image of component housing 176 can be attached on an opposite side arm 173B to make it positionable over the left eye of the user. Depending on the application of HMD 172 or individual user preferences, it may be desirable to position component housing 176 on a particular side of the user's head. For example, a right-handed person may prefer having the component housing 176 on the right side of her head to make interaction with touch-based input 126 easier. In another example, a person may prefer to have the display 180 over a dominant eye for easier interaction with elements presented on display 180 or over a non-dominant eye to make it easier to shift his focus away from elements presented on display 180 when engaged in other activities.

Figure 4:
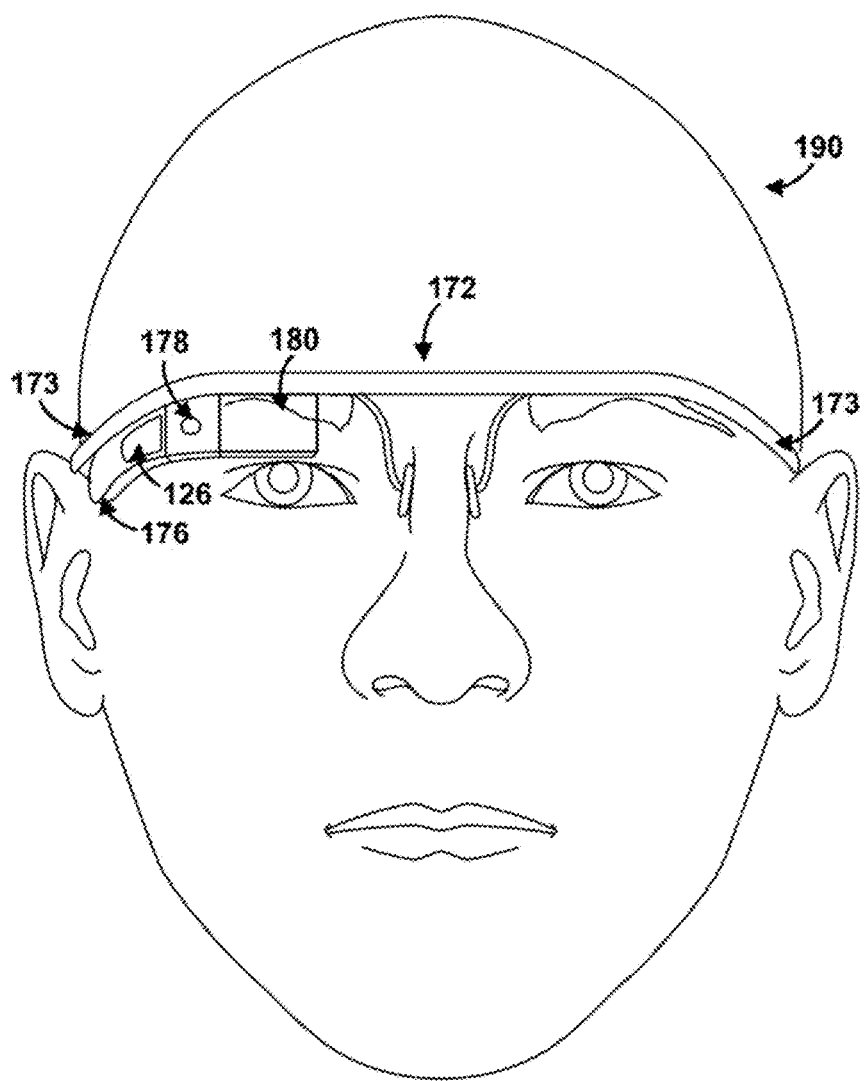
FIGS. 4 and 5 show a front elevation view and a side elevation view of the device of FIG. 2 being worn by a user.
Figure 5:
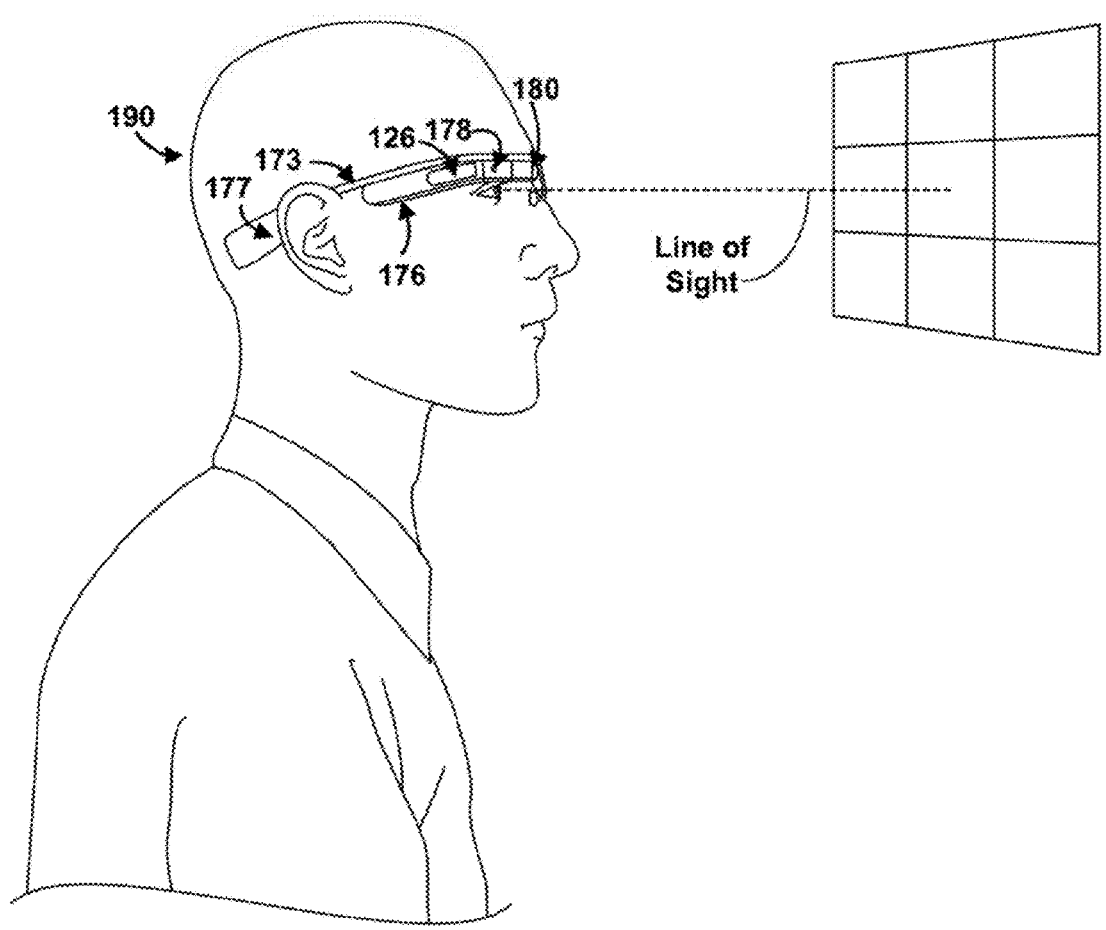
Figure 6:
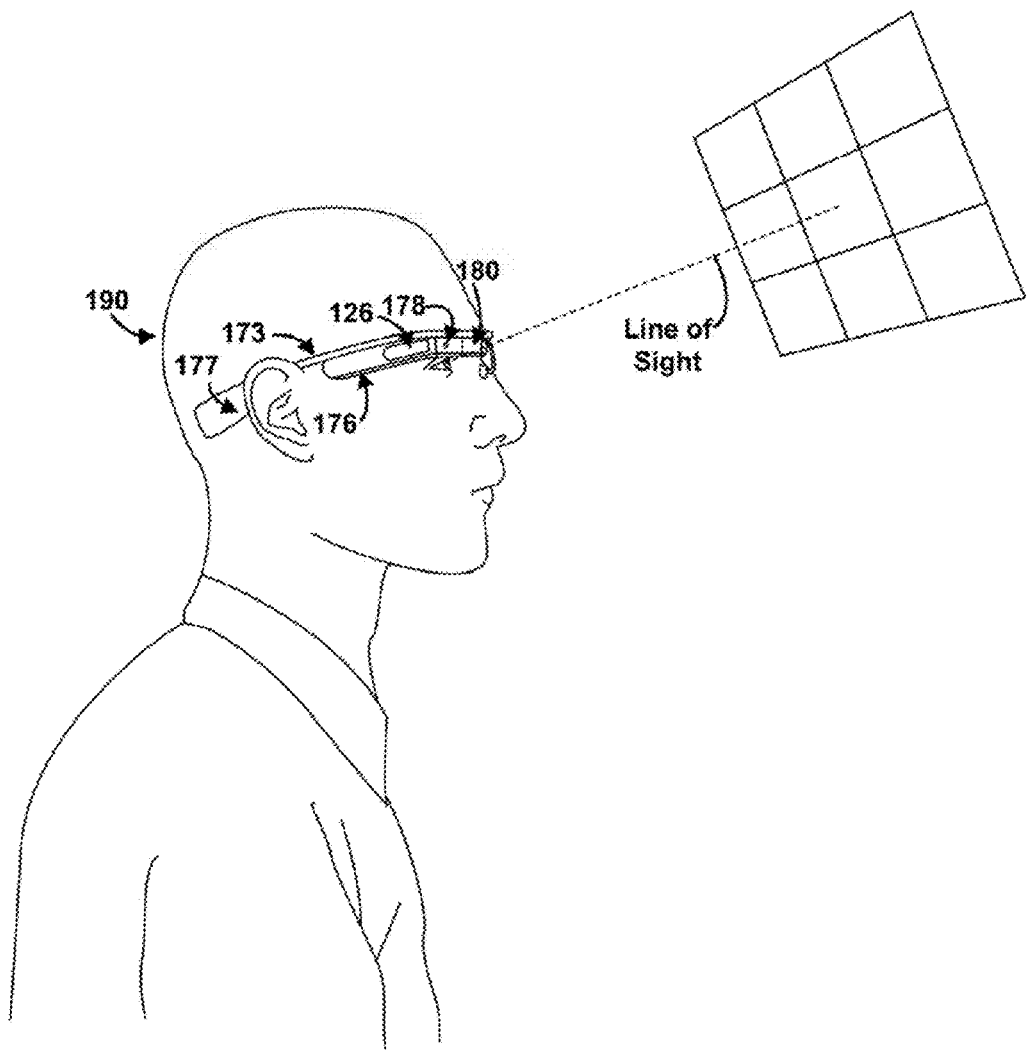
FIG. 6 shows the device of FIGS. 4 and 5 in an adjusted configuration thereof.

FIGS. 4-6 are simplified illustrations of the HMD 172 shown in FIGS. 2 and 3, being worn by a wearer 190. As shown in FIG. 4, when HMD 172 is worn, BCT 186 is arranged it is located behind the wearer's ear. As such, BCT 186 is not visible from the perspective shown in any of FIGS. 4-6.

In the illustrated example, the display 180 may be arranged such that when HMD 172 is worn, display 180 is positioned in front of or proximate to a user's eye. For example, display 180 may be positioned below the center frame support and above the center of the wearer's eye, as shown in FIG. 4. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 4-6, display 180 may be located in the periphery of the field of view of the wearer 190, when HMD 172 is worn. Thus, as shown by FIG. 5, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others and can also generally provide unobstructed viewing and perception of the world within the central portion of the wearer's field of view. Further, when the display 180 is located as shown, the wearer 190 may view the display 180 by, e.g., looking up with their eyes only. This is illustrated as shown in FIG. 6, where the wearer has moved their eyes to look up and align their line of sight with display 180. A wearer might also use the display by tilting their head down and aligning their eye with the display 180.

In some examples of HMD 172 and similar structures, it may be advantageous to provide various components in one or more external structures that can be selectively attached with HMD 172, as needed. For example, HMD 172 may be provided with an internal battery, as discussed above, within auxiliary housing 177. Such a battery can be sized to balance size and weight considerations with the power storage requirements of a determined average use between availability of charging. Such a balancing may result in a battery that has less power capacity than may be needed for lengthy use of HMD 172 or particular types of use that require greater levels of power (such as video-streaming, communication via a cellular data network, or the like). For extended use of HMD 172 under such circumstances, it may be beneficial to provide an external power supply that can attach with HMD 172.

In a similar respect, it may also be advantageous, for size, weight, or form-factor considerations to include additional electronic components in similar external structures that can be attached with HMD 172. In an example, circuitry for use with certain types of wireless communication systems can be provided in such a structure. In an example of HMD 172 that includes internal WiFi communications circuitry as well as Bluetooth® circuitry, or another short-range digital communications protocol, cellular communications circuitry may not be needed during average use of HMD (as WiFi or the use of the cellular connection of a device tethered to HMD 172 by Bluetooth® or the like can be used to achieve a desired data connection). To allow a user of HMD 172 to have the option of a separate cellular connection with HMD 172, an external structure with cellular circuitry can be provided for use with and attachment to HMD 172. As used herein, cellular circuitry can refer to the electronic components and devices usable by a device to connect with any type of mobile communication network, including voice and/or data networks (GSM, CDMA, etc.) using any available protocol (such as 3G, 4G, LTE, or the like).

Figure 7:
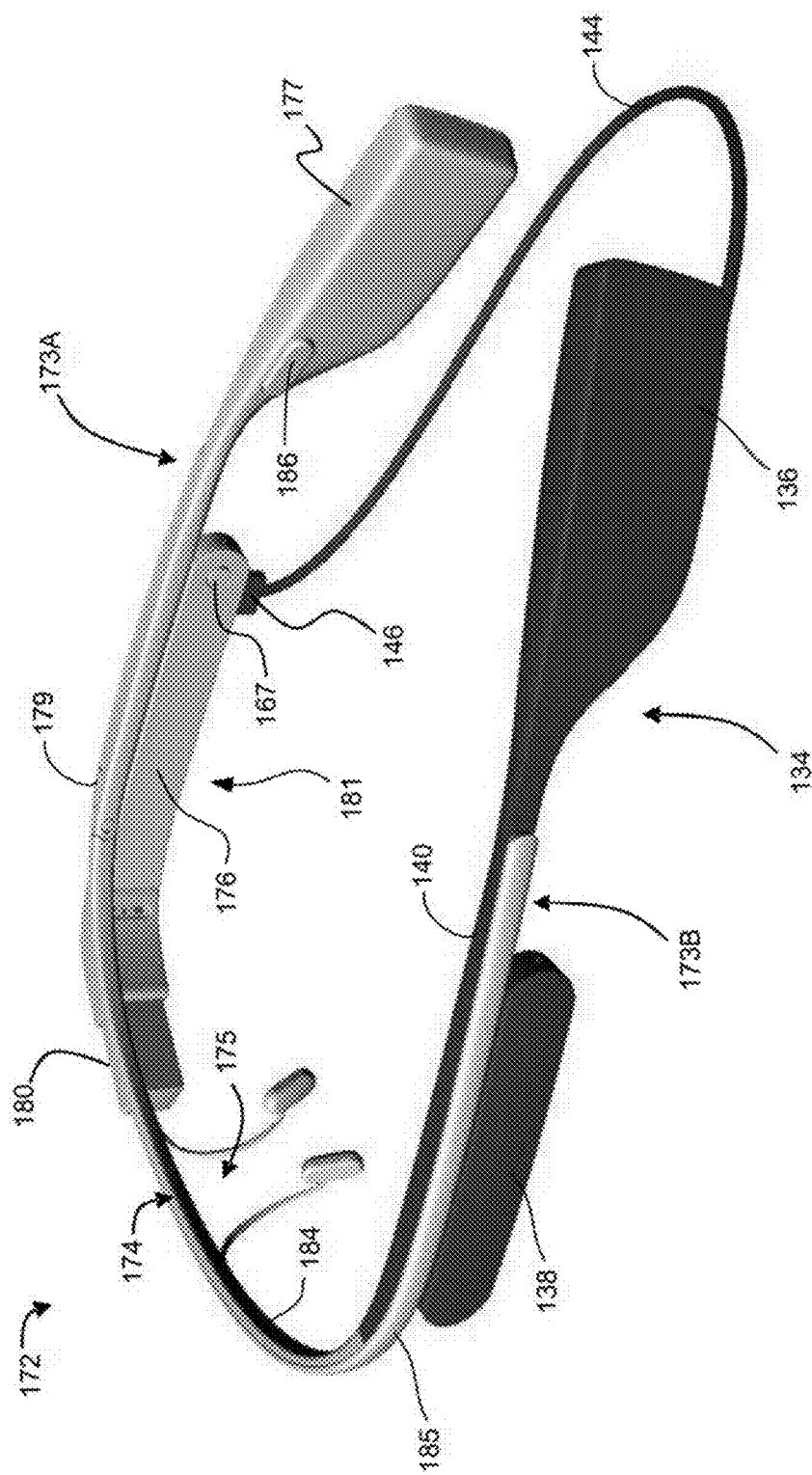
FIG. 7 shows the device of FIGS. 2 and 3 assembled with an auxiliary component unit according to an aspect of the present disclosure.

An example of an accessory module 134 that can be used with HMD 172 is shown in FIG. 7. Accessory module 134 is configured to be removably attachable to band 182 and to be capable of electrically connecting with display module 281. By configuring accessory module 134 as such, variations of the above-described external electrical components can be electrically connected with HMD 172 in a manner such that they can be conveniently carried or located by the wearer of HMD 172. Attachment of the accessory module 134 provides certain advantages over variations thereof that could not be attached with HMD. For example, if an accessory module had to be carried elsewhere, a long cable would have to be provided to electrically connect the accessory module with the HMD 172. Such a cable could easily become dislodged, or cause unwanted pulling or movement of HMD 172 or become entangled with other items. Further, the wearer of HMD would need to have adequate pocket space or other means of physically carrying the accessory module when in use. Accordingly, the accessory module 134 of FIG. 7 is configured such that it can be assembled onto HMD 172, as will be described further below.

Accessory module 134, as illustrated, includes a first housing 136 and a second housing 138. These separate housings 136 and 138 can be provided, for example to mirror the arrangement of display module 281, which includes component housing 176 and auxiliary housing 177 that are positioned separate from each other and are positioned on different sides (i.e. front and back) of the adjacent ear of the wearer (as shown in FIGS. 4-6). This can be done for aesthetic purposes as well as to maintain a comfortable level of balance (both left-to-right and front-to-back) for HMD 172 when being worn. The separate housings 136 and 138 can also be provided to prevent possible electronic interference between different types of components. A connector arm 140 can be used to retain the separate housings 136 and 138 in a single unit.

Figures 8A, 8B:
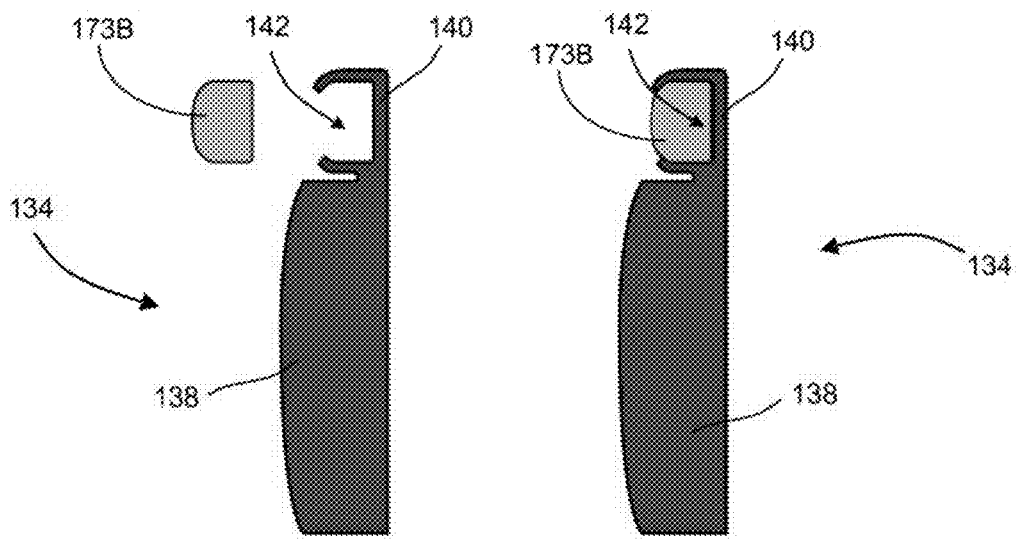
FIGS. 8A and 8B show detail of an attachment feature of the unit of FIG. 7 in a disassembled and an assembled state with a portion of the device of FIGS. 2 and 3.
Figure 9:
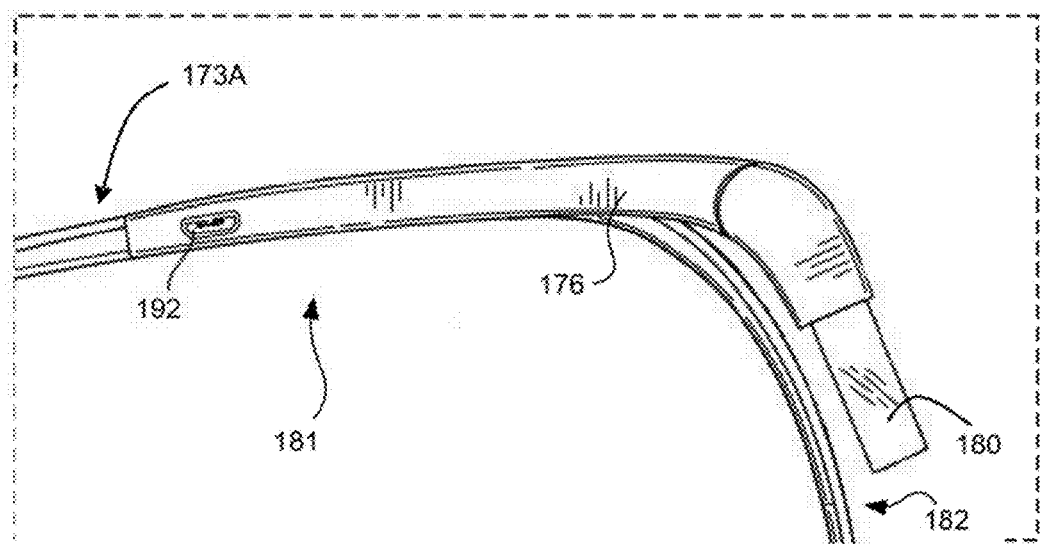
FIG. 9 shows a detail view of the device of FIGS. 2 and 3 including an electronic connection feature thereof.

In the example shown in FIG. 7, connector arm 140 can extend from an end of housing 136 in an elongated manner such that it extends in a path that matches that of side arm 173B of HMD 172. Connector arm 140 can include a channel 142 therein, as shown in FIGS. 8A and 8B, that can be sized to receive a portion of side arm 173B therein. Channel 142 can further be configured to retain accessory module 143 to HMD 172 by a press-fit or snap-fit arrangement over arm 173B. To facilitate this arrangement, channel 142 can be somewhat undersized relative to arm 173B and made of a resiliently flexible material such that it can generate pressure against arm 173B when received therein.

Housing 138 can extend from connector arm 140 such that it is positioned below side arm 173B, when accessory module 134 is assembled therewith. Further, housing 138 can be shaped to extend along a portion of the length of connector arm 140. Other locations and orientations for housing 138 are also possible and can be changed depending on the size of the components retained therein, as well as aesthetic or weight distribution purposes.

A connection cable 142 can extend from a portion of accessory module 134 and can be connected (either directly or through various additional communication or control circuitry) with the components within housing 136 or housing 138. The cable can include a connection end 146 that is provided to mate with a connection feature 192 external to the component housing 176 of HMD 172 (FIG. 9) so that accessory module 134 can be electrically connected with HMD 172, as shown in FIG. 7. Cable 142 can be configured with a length sufficient to extend around the back of a user's head when being worn and can further be of a length sufficient to not interfere with the user's ability to easily put on or take off HMD 172 when accessory module 134 is connected therewith.

The resulting assembly of accessory module 134 with HMD 172 can provide additional functionality for HMD 172, depending on the varying needs of the user. In an example, HMD can include cellular connection circuitry in one housing (e.g., housing 138) and an additional battery in the other housing (e.g., housing 136). As such HMD 172 can be worn and used without accessory module 134 while the built-in battery within housing 177 has a sufficient charge and/or when HMD 172 is carrying out functions either using internal memory, by a WiFi or other connection facilitated by built-in circuitry (such as a tethered cellular connection, as described above). When additional power is needed or an internal cellular connection is desired, for example, accessory module 134 can be attached to HMD 172, as described above, and connected therewith using cable 140.

Other components can be included in accessory module 134 or variations thereof in combinations that would be advantageous for various users of HMD 172. In an example each housing 136 and 138 can include additional batteries to provide even more additional power for HMD 172. In a further example, one of the housings 136 or 138 can include additional memory and/or one of the housings 136 or 138 can include an additional processor such as a dedicated graphics processor or the like. Such components can be included in an accessory module 134 in a combination to enhance the usefulness thereof. For example, the use of an internal cellular data connection can consume power more rapidly than other forms of data connections, making the additional inclusion of an auxiliary battery beneficial.

In other examples, only a single housing can be included in an accessory module that is generally similar to that shown in FIG. 7 but with only a single housing. For example a connector arm 140 can be provided with only housing 136 extending therefrom or only housing 138 attached thereto. In the later example, the cable 140 can extend directly from the end of the connector arm or from out of housing 138. Another variation of an accessory module 134 can include a housing similar to component housing 176 of HMD 172, complete with an additional display similar to display 180 to provide stereoscopic display functionality for HMD 172.

In another variation, an accessory module can take the form of a modular assembly structure that can be integrated with HMD 172 by connecting therewith through a variation of a band that includes internal wiring and or circuitry and can otherwise facilitate physical attachment with housing structures that are used in connection with the assembly. In the example of HMD 172 described above in reference to FIGS. 2-6, the band 182 is passive in nature. That is, it includes no internal wiring or circuitry and may not be specifically adapted to facilitate attachment with any external components. An alternative band structure 240 (examples of which are shown in FIGS. 11 and 12) can be provided in an HMD, either integrally or in replacement of a passive band that is configured to be removed from a display module 281 in a variation of HMD 272 shown in FIG. 10.

Figure 10:
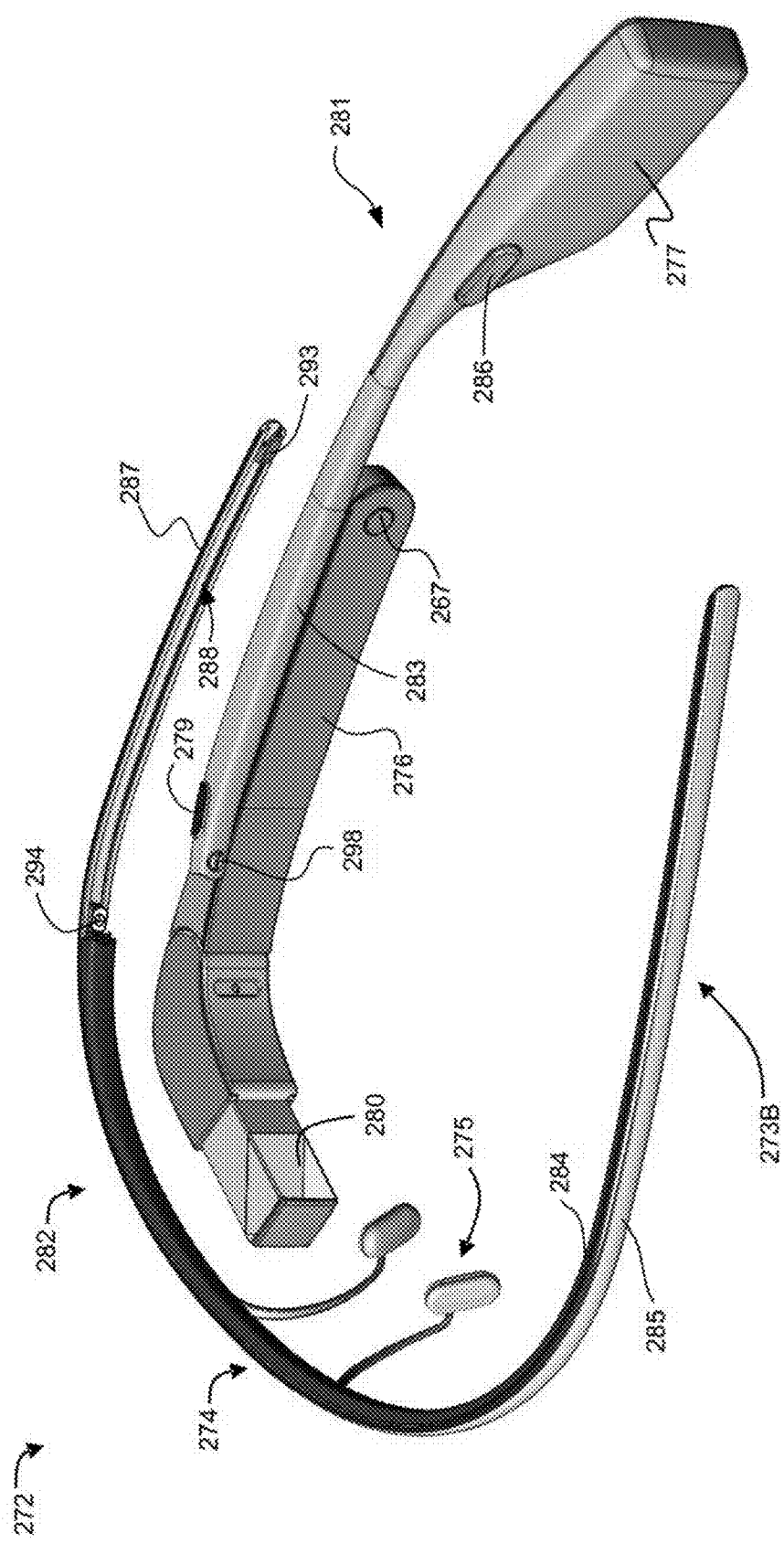
FIG. 10 shows the device of FIG. 2 according to a modular configuration thereof in a disassembled state.
Figure 11:
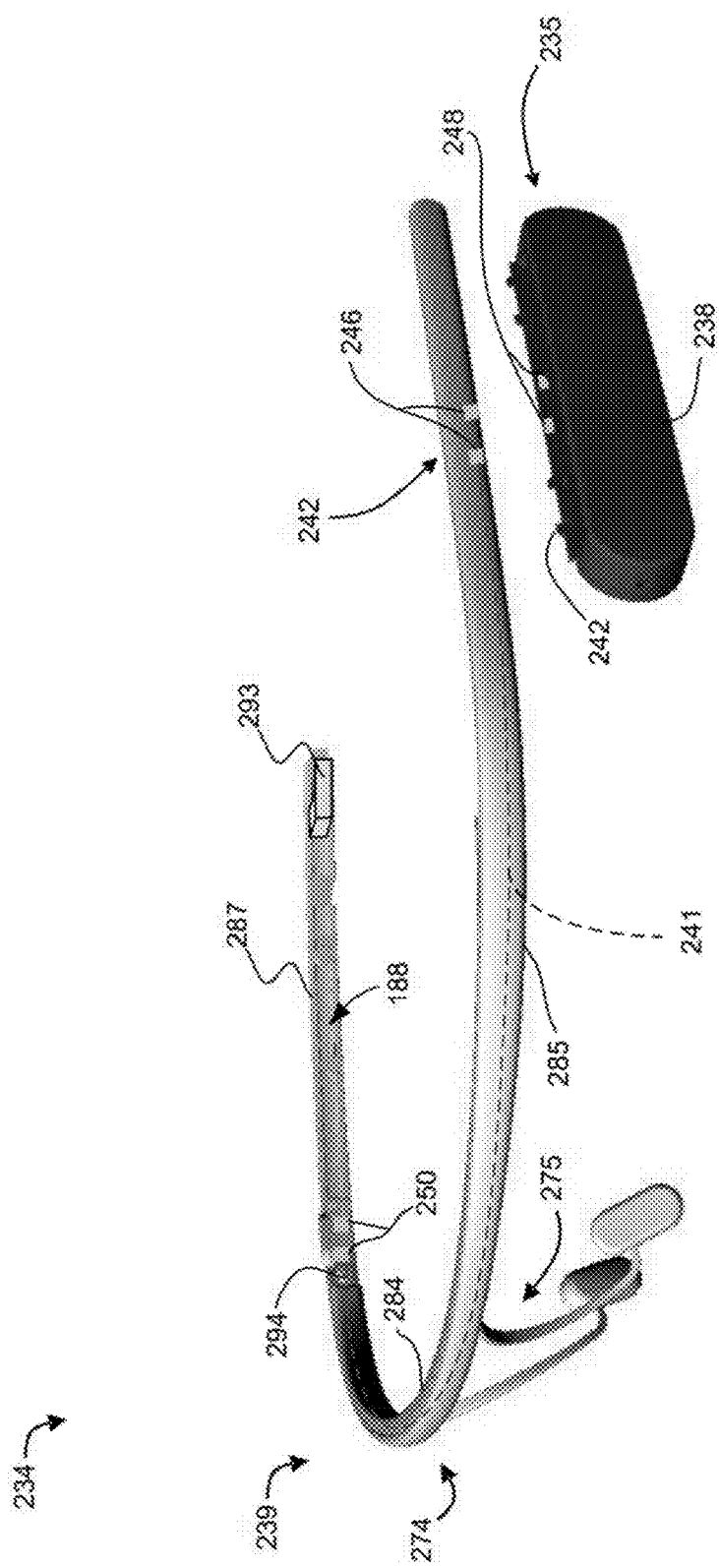
FIG. 11 shows a retention assembly including a modular accessory component in an exploded view.

Specifically, FIG. 10 illustrates an aspect of HMD 272, in which component housing 276 and auxiliary housing 277 can be included in a display module 281. Display module 281 can be configured to be attachable with and detachable from a separate band 282 such that when the display module 281 and band 282 are attached together the HMD 170 can be a single unit that is wearable on the head of a user as described above with respect to FIGS. 4-6. In an example, display module 281 can include all or substantially all of the electronic components of HMD 172 such that display module 281 can be a fully-functioning unit on its own, with band 282 being provided to allow display module 281 to be worn on a user's head.

Both display module 281 and band 282 can be structured to present a unitary appearance when assembled together or, in other words, to hide or minimize the visual effect of the separation between such components. Further, display module 281 and band 282 can be structured to give an appearance that auxiliary housing 277 extends unitarily from a portion of band 282 to form an uninterrupted side arm 273A and, further, such that component housing 276 is attached beneath band 282 in a separate structure. Other configurations can be used to achieve different visual or appearance characteristics. To achieve the aforementioned visual and appearance characteristics, display module 281 can include a connector arm 283 that extends between and connects together component housing 276 and auxiliary housing 277. Connector arm 283 can also include wiring or other circuitry therein to electrically connect devices within component housing 276 with devices within auxiliary housing 277. Connector arm 283 can be configured to extend continuously with an inner portion 284 of band 282 when band 282 and display module 281 are assembled together to give the appearance that connector arm 283 is unitary with inner portion 284 of band 282.

As mentioned above, band 282 can be configured to include an inner portion 284 and an outer portion 285. Inner portion 284 can be configured to exhibit a generally compliant or soft characteristic and can include any portions of the band 282 that are intended to contact the user's head. In the particular embodiment shown, inner portion 284 can define a continuous inner surface of band 282. Inner portion 284 can be made of any material that can provide a degree of compliance to enhance the comfort of the fit of band 282 on the user's head while being able to retain its general shape. Acceptable materials include various foams, such as foam rubber, neoprene, natural or synthetic leather, and various fabrics.

Outer portion 285 of band 282 can be made of a resiliently flexible material such as metal or plastic. In general, the nature of such a material should be such that outer portion 285 can maintain the desired shape for band 282 while allowing flexibility so that band 282 can expand to fit on a user's head while applying a comfortable pressure thereto to help retain HMD 272 on the user's head. Outer portion 285 can be elastically deformable up to a sufficiently high threshold so that the shape of band 282 may not become permanently deformed simply by being worn by a user with a large head. Acceptable materials for outer portion 285 include metals such as aluminum, nickel, titanium (including grade 5 titanium), various steels (including spring steel, stainless steel or the like), or alloys including these and other metals. The thickness of outer portion 285 can be adjusted, depending on the material used, to give the desired flexibility characteristics. As also shown in FIG. 10, nosepiece 275 can be included on band 282 and, in particular, can be attached to or integrally formed with outer portion 285 thereof.

Inner portion 284 of band 282 can be configured to extend only partially along outer portion 285 such that outer portion 285 defines an attachment arm 287 of band 282 that extends beyond inner portion 284. Attachment arm 287 can be configured to extend over a portion of display module 281 when band 282 is assembled therewith. As shown in FIG. 10, attachment arm 287 can be configured to be positioned along a portion of connection arm 283 of display module 281. As will be described in greater detail below, in such a configuration attachment arm 287 and connector arm 283 can include one or more respective inter-engaging attachment features so that band 282 and display module 281 can be attached together therebetween.

Inner portion 284 of band 282 can have a profile such that it at least partially fits within a channel formed by outer portion 285. Inner portion 284 can be sized to fit within a channel 288 formed by a generally U-shaped cross-sectional profile of outer portion 285. Such a channel can extend beyond the end of inner portion 284 such that at least a portion of connector arm 283 can be received within the channel 288. Such a portion of connector arm 283 can be configured to form a snap-fit with channel 288 that can be used to connect band 282 with display module 281 or to at least supplement such a connection.

FIG. 10 further shows an example of features that can be included in band 282 to attach the two components together, as described above. As shown in FIG. 10, band 282 can include a hook 293 that extends outwardly from channel 288 and is positioned near the end of attachment arm 287. Band 282 can also include a threaded hole 294 positioned within channel 288 on attachment arm 287 opposite hook 293. Display module 281 includes a screw 298 that extends therethrough and is positioned to align with threaded hole 294 when display module 281 is positioned for attachment with band 282. Display module 281 can also include a slot (not shown) therein configured to align with and receive hook 293 therein. The slot can include a portion that is open on a face, such as an outer face of the connector arm 283 along a portion thereof. The slot can further include a closed portion that is in communication with the open portion but is closed relative to the face of connector arm 283. In this configuration, the slot can receive hook 293 therein by alignment of hook 293 with the open portion thereof. Hook 293 can then be moved into the slot and then slid such that a portion thereof is disposed within the closed portion of the slot. In this position, hook 293 can retain band 282 against display module 281.

The slot 290 can be positioned on connector arm 283 opposite screw 298 such that all features can simultaneously align to cooperatively attach display module 281 and band 282 together. In such a manner, when hook is positioned within the slot, as described above, screw 298 can be screwed into threaded hole 294 to secure band 282 and display module 281 together at that point and to further restrict relative sliding or translational movement between band 282 and display module 281 so that hook 293 is retained within the slot. Such an arrangement can provide a secure attachment between band 282 and display module 281 with a single feature to be actuated by the user. Further, by including multiple points of attachment between band 182 and display module 281, the attachment can be more robust and resistant to movement therealong, in particular any bending movement along side arm 273.

As discussed above with respect to FIG. 10, display module 281 can include one or more snap features (that can be similar to the snap features 299 shown in FIG. 12) thereon that can be configured to engage with a corresponding portion of band 282. In the example shown in FIG. 10, such snap features can be positioned on the outer face of connector arm 283 so as to extend between the slot and threaded hole 294 and to align with channel 288 of the outer portion 285 of band 282. Snap features 299 can be configured to engage with channel 288, such as by configuring channel 288 and the corresponding snap features with inter-engaging projections and undercuts.

Such a snap-fit arrangement can help to retain portions of display module 281 between a slot and screw 298 in contact with band 282. In the example shown in FIG. 10, this can include retaining portions of connector arm 283 between the slot and screw 298 in contact with the attachment arm 287 defined by outer portion 285 of band 282. This can provide visual enhancement for the connection between band 282 and display module 281 by minimizing any gap between components and by contributing to the unitary visual appearance between components, as discussed above. This snap-fit arrangement can also physically enhance the connection between display module 281 and band 282 by providing additional points of connection therebetween to make the overall connection more robust. It can also help maintain a temporary connection between display module 281 and band 282 after hook 293 has been positioned within slot 296 before screw 298 is threaded into hole 294 to make assembly easier for a user.

In other examples, such a snap fit can be made to be strong enough to allow for display module 281 to be assembled with band 282 without the use of a screw 298 or aligning threaded hole 294. In another example, another press- or snap-fit feature can replace the screw 298 and hole 294 combination described above in generally the same location thereof.

The ability to detach band 282 from display module 281 can be used to provide a configuration for HMD 272 in which other structures can be configured to attach with display module 281 in a similar manner to band 282. As mentioned above, one such structure that can be used in place of band 281 in connection with display module 281 is an active band 239. As shown in FIGS. 11 and 12, active band 239 can be configured to have the same overall visual appearance as band 282 and can also include a similar inner portion 284 and outer portion 285 that can be made of the same or similar materials. Active band 239 can also include a nosepiece 275 similar to that of band 282 as well as similarly-configured side arms 273A and 273B Active band 239 can also have the same overall size and shapes as band 282 and can further be provided in a number of different sizes to be wearable by users with differently-sized heads.

Active band 239 can be configured to attach to the display module 281 in a manner similar to band 282 and can include the same or similar structures to facilitate such attachment. For example active band 239 can also include an attachment arm 287 to extend along a portion of the outer surface 266 of connector arm 283. The attachment arm 287 can include a channel 288 to engage in a snap-fit arrangement with snap features of connector arm 283, as discussed above. The attachment arm 287 of active band 239 can also include a hook and threaded hole in a similar location and arrangement of those shown on band 282 in FIG. 10.

As shown in FIGS. 11 and 12, active band 239 can be configured to be used in an assembly 234 of modular components that include various accessories or auxiliary electronic components similar to those discussed above with respect to accessory module 134. Specifically, active band 239 can include a second attachment arm 242 along side arm 273B. The attachment arm 242 can include an overall shape or include specific features, such as interengaging snap-fit features or the like, that can attach with various housing modules, such as housing module 235, shown in FIG. 11, and/or housing module 237, shown in FIG. 11, which can include mating physical attachment features 244. In such an arrangement, HMD 272 can be configured as an assembly of active band 239 and display module 281 and can be worn without any additional housing modules assembled therewith. This would appear and function generally similar to HMD 172, as shown in FIG. 5.

If needed or desired for various additional functions for HMD 272, various housing modules can be assembled onto active band 239. As shown in FIG. 11, housing module 235 can include a single housing 238 and can be attached to active band 239 in a location similar to housing 138 of accessory module 134, discussed above. The inter-engaging attachment arm 242 and attachment features 244 can facilitate the physical attachment therebetween. Further, active band 239 can include internal wiring or other circuitry that extends between attachment arm 242 and the opposite attachment arm 287. Electrical contacts 246 can be present on attachment arm 242 and can be positioned to electrically connect with aligning contacts 248 on housing module 235 when physically attached to active band 239. Similar contacts 250 can be present on attachment arm 287 that can positioned to electrically connect with aligning contacts (not shown) on display module 281 (that act as an additional or alternative external connection feature for display module 281, and in particular component housing 276) when physically attached therewith. Contacts on active band 239 can be connected together using the internal wiring 241 such that housing module 235 can be in electrical communication with display module 281 through active band 239 when the components are assembled together.

Housing module 235 can include any of the various electrical components discussed above with respect to accessory module 134, including cellular data connection circuitry and/or an additional battery, among others. Housing module 235 can also include multiple electrical components.

An alternative housing module 237 is shown in FIG. 12 that can be similarly adapted to be used with active band 239 in an accessory module assembly 234'. Housing module 236 includes a first housing 236 and a second housing 238 that can be similarly configured to the first housing 136 and second housing 138 discussed above with respect to FIG. 7. A connecting arm 240 can extend between first housing 236 and second housing 238 and respectively attach therewith to secure first housing 236 and second housing 238 together single housing module 235. The housings 236 and 238 can be configured and positioned relative to each other in a manner similar to the housings 136 and 138 discussed above with respect to FIG. 7, including for aesthetic and/or weight distribution considerations.

The connecting arm 240 of housing module 237 can be configured to physically connect with the attachment arm 242 of active band 239 in a manner similar to the connection between display module 281 and attachment arm 287 of band 282, as described above with respect to FIG. 10. As such, the connector arm 240 of housing module 237 can include features similar to those of connector arm 283 of display module 281, including snap features 299 and/or the above-described combination of a slot (not shown) and a screw that can be similar to the screw 298 shown in FIG. 10. These features can be configured to engage with features that can be formed on the attachment portion 242 of active band 239 that can be similar to those discussed above for the attachment arm 287 of band 282, including a channel 288 [188 IN FIG. 10], a hook 293, and a threaded hole 294. In an example, active band 239 and the connecting arm 240 of housing module 237 can be configured to attach together using only snap-fit structures, such as an inter-engaging channel and snap feature arrangement. In another example, a magnetic attachment can be used between active band 239 and housing module 237, as well as between active band 239 and housing module 235.

As with the previously-described example of accessory module 134, housing module 237 can include one or more electronic accessory components such as, one or more batteries, communications circuitry (including but not limited to cellular communications circuitry), memory, additional processor(s) or the like. Housing module 237 can include multiple electronic components among the first housing 236 and second housing 238. In an example, a battery can be included in first housing 236 and cellular communications circuitry can be included in second housing 238. Other configurations and arrangements are possible, including those where more than one electronic accessory component is included in a single one of the housings 236 or 238, and further including any combinations that are given in other examples herein.

Further, first housing 236 and second housing 238 can be electrically connected to each other through connector arm 240 and/or to internal circuitry or components that are configured to manage the connections between the various electronic accessory components within the housings 236 and 238 and within display module 281. Active band 239 can be configured to facilitate electronic communication between housing module 237 and display module 281 in the same manner as it facilitations the connection between housing module 235 and display module 281. Specifically, active band includes internal wiring or other circuitry that connects with sets of contacts 246 and 250 that align respectively with contacts 244 on housing module 237 and contacts (not shown) on display module 281. Housing module 237 can be configured such that the contacts 244 thereon align with the same contacts as those of housing module 235 so that the two different housing modules 235 and 237 can be used interchangeably at the selection of the user of HMD 272. A further example of a housing module can include only a housing similar to first housing 236 that can extend from a feature similar to connector arm 240 or a shortened version thereof.

In various examples, variations of active band 239 of different sizes, colors or other configurations can be provided for attachment with display module 281. Other components having similar features to active band 239, including the features to facilitation attachment with display module 281 or housing modules 235 or 237 and to facilitate an electrical connection therebetween can be structured to include lens frames for corrective or protective use. These can be similar to the frame structures discussed in co-pending U.S. patent application Ser. No. 13/762,146, the entire disclosure of which is incorporated by reference herein. Such a frame structure can be provided in different sizes, shapes, styles or colors for use with display module 281. In a commercial setting, modules 281 and various bands 282, active bands 239 and/or frame structures (both active and passive) can be packaged and sold separately to allow consumers to configure various final HMD assemblies 272 according to their own taste or preference. In another example, an HMD 272 consisting of a display module 281 and band 282 as shown herein can be sold attached together in single unit, with the consumer having the ability to swap out the included band 282 for another active band, active frame structure, or the like.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. An auxiliary component removably attachable with a head-mounted device, the head-mounted device including a first side arm with and an extension arm extending at least partially therealong and configured to present information to a wearer via a display coupled to the extension arm, a second side arm opposite the first side arm, and an external connection feature connected with internal circuitry of the extension arm, the auxiliary component comprising:
   a first attachment member configured to removably attach the auxiliary component with a portion of the second side arm of the head-mounted device, the first attachment member having a proximal end and a distal end;
   a first housing containing a first electronic component therein, the first housing having a proximal end adjacent to the distal end of the first attachment member and a distal end; and
   a wiring component in communication with the first electronic component, the wiring component having a proximal end adjacent to the distal end of the first housing and a distal end configured to attach with the external connection feature of the head-mounted device.

2. The auxiliary component unit of claim 1, wherein the first electronic component is one of a battery, cellular communication circuitry, WiFi communication circuitry, a computer processor, or memory.

3. The auxiliary component unit of claim 1, wherein the first electronic component is a battery, the auxiliary component further including a second electronic component that includes communications circuitry.

4. The auxiliary component unit of claim 1, wherein the first attachment member includes a resiliently deformable channel sized to capture and maintain a portion of the second side arm therein.

5. The auxiliary component unit of claim 1, wherein, when the auxiliary component is attached with the head-mounted device, the first housing extends from the attachment member at a position along and aligned with the second side arm of the device to a location alongside the head of the wearer on a side of an adjacent ear opposite an adjacent eye of the wearer, and wherein the auxiliary component further includes a second housing containing a second electronic component therein and positionable alongside the head of the wearer in a position between the adjacent ear and eye of the wearer.

6. The auxiliary component unit of claim 1, wherein the wiring component is a connection cable at least partially external to the first housing and external to the head-mounted device, and wherein the connection cable includes a connection end configured to be received by the external connection feature of the head-mounted device.

7. The auxiliary component unit of claim 1, wherein the wiring component includes a first conductive contact on a surface of the first attachment member, the first conductive contact being positioned to engage with a second conductive contact on a surface of the first side arm when the auxiliary component is affixed with the head-mounted device.

8. The auxiliary component unit of claim 1, wherein the first attachment member includes a snap-fit feature configured to engage with a channel defined on an interior surface of the second side arm, and wherein the wiring component is on a surface defined within the snap-fit feature and is positioned to engage with the second conductive contact within the channel.

9. The auxiliary component unit of claim 1, wherein the attachment member is positioned over an upper surface of the first housing such that, when the auxiliary component is attached to the head-mounted device, the attachment member extends along a portion of the second side arm and such that the first housing is positionable alongside the head of the wearer in a position between an adjacent ear and an adjacent eye of the wearer when the device is being worn.

10. The auxiliary component unit of claim 1, wherein the attachment member extends from an end of the first housing such that, when the auxiliary component is attached with the head-mounted device, the first housing extends away from an end of the second side arm and is positionable in a location alongside the head of the wearer on a side of an adjacent ear opposite an adjacent eye of the wearer when the head-mounted device is being worn.

11. The auxiliary component unit of claim 1, wherein the first housing is configured to have a first end disposed toward an end of the second side arm and to be laterally aligned with a first end of the extension arm that is disposed away from the display when the auxiliary component is assembled therewith, and wherein the first housing is configured to have a first height that is approximately equal to a height of the extension arm.

12. The auxiliary component unit of claim 1, wherein the head-mounted device further includes a component housing extending from a free end of the first side arm to an end and having a first weight, and wherein the first housing is configured to be of a second weight that is approximately equal to the first weight, a similar shape and to be laterally aligned with the end of the component housing of the device.

* * * * *